(12) United States Patent
Jung et al.

(10) Patent No.: US 12,625,647 B2
(45) Date of Patent: May 12, 2026

(54) STORAGE DEVICE AND PREFETCH METHOD THEREOF

(71) Applicant: Samsung Electronics Co., Ltd.,
Suwon-si (KR)

(72) Inventors: Daejin Jung, Suwon-si (KR);
Yonghwan Song, Suwon-si (KR);
Jeong-Woo Park, Hwaseong-si (KR)

(73) Assignee: Samsung Electronics Co., Ltd.,
Gyeonggi-do (KR)

( * ) Notice: Subject to any disclaimer, the term of this
patent is extended or adjusted under 35
U.S.C. 154(b) by 0 days.

(21) Appl. No.: 18/507,332

(22) Filed: Nov. 13, 2023

(65) Prior Publication Data

US 2024/0402945 A1     Dec. 5, 2024

(30) Foreign Application Priority Data

Jun. 2, 2023     (KR) ........................ 10-2023-0071886

(51) Int. Cl.
G06F 12/00         (2006.01)
G06F 3/06          (2006.01)

(52) U.S. Cl.
CPC .......... G06F 3/0659 (2013.01); G06F 3/0679
(2013.01); *G06F 3/0626* (2013.01)

(58) Field of Classification Search
CPC .... G06F 3/0659; G06F 3/0679; G06F 3/0626;
G06F 12/04; G06F 2212/214; G06F
2212/311; G06F 2212/463; G06F
2212/6028; G06F 2212/7201; G06F
12/0862; G06F 12/0868; G06F 3/061;
G06F 3/0658; G06F 2212/602
See application file for complete search history.

(56) References Cited

U.S. PATENT DOCUMENTS

| | | | |
|---|---|---|---|
| 9,355,027 B2 | 5/2016 | Park et al. | |
| 9,483,469 B1 | 11/2016 | Chiueh et al. | |
| 9,582,204 B2 | 2/2017 | Sarcone et al. | |
| 10,001,927 B1 * | 6/2018 | Trachtman | G06F 3/0659 |
| 10,453,524 B2 | 10/2019 | Kaminaga et al. | |
| 10,818,328 B2 | 10/2020 | Kim et al. | |
| 11,048,628 B2 | 6/2021 | Chakravarty | |
| 11,269,778 B1 * | 3/2022 | Kanteti | G06F 12/0873 |
| 2005/0228955 A1 | 10/2005 | Day et al. | |

(Continued)

FOREIGN PATENT DOCUMENTS

WO         2022/193238 A1     9/2022

OTHER PUBLICATIONS

JEDEC Standard, Universal Flash Storage (UFS), Version 4.0,
JESD220F, Aug. 2022.

(Continued)

*Primary Examiner* — Arvind Talukdar
(74) *Attorney, Agent, or Firm* — Harness, Dickey &
Pierce, P.L.C.

(57) ABSTRACT

A storage device may include a non-volatile memory con-
figured to store one file as a plurality of file fragments, and
a storage controller configured to receive a read command
with respect to the plurality of file fragments from a host
through UFS protocol information unit (UPIU), and perform
prefetching on the plurality of file fragments based on file
fragmentation information included in an extra header seg-
ment (EHS) field of the UPIU.

20 Claims, 19 Drawing Sheets

(56) References Cited

U.S. PATENT DOCUMENTS

| | | | |
|---|---|---|---|
| 2009/0019229 A1* | 1/2009 | Morrow | G06F 12/0862 |
| | | | 711/137 |
| 2014/0223083 A1 | 8/2014 | Park et al. | |
| 2015/0193155 A1 | 7/2015 | Sarcone et al. | |
| 2018/0090202 A1 | 3/2018 | Kaminaga et al. | |
| 2019/0034364 A1* | 1/2019 | Lee | G06F 13/1673 |
| 2019/0164615 A1* | 5/2019 | Kim | G06F 3/0659 |
| 2019/0227743 A1 | 7/2019 | Hamilton | |
| 2019/0310938 A1 | 10/2019 | Chakravarty | |
| 2020/0035278 A1 | 1/2020 | Kim et al. | |
| 2022/0244869 A1* | 8/2022 | Kanteti | G06F 3/0631 |
| 2022/0350744 A1* | 11/2022 | Urrinkala | G06F 12/0246 |
| 2024/0004552 A1* | 1/2024 | Zhang | G06F 3/0661 |
| 2024/0231690 A1* | 7/2024 | Park | G06F 3/0679 |
| 2024/0311044 A1* | 9/2024 | Liang | G06F 3/0656 |

OTHER PUBLICATIONS

Extended European Search Report dated May 17, 2024 for corresponding European Patent Application No. 23214760.3.

* cited by examiner

TO/FROM
(210)

| READ COMMAND UPIU | | | |
|---|---|---|---|
| 0<br><br>xx00 0001b | 1<br><br>Flags | 2<br><br>LUN | 3<br><br>Task Tag |
| 4<br><br>IID/CS Type | 5<br><br>Reserved | 6<br><br>Reserved | 7<br><br>Reserved |
| 8    Total<br>EHS Length | 9<br><br>Reserved | 10<br><br>Data | 11<br><br>Segment Length |
| 12 | 13 | 14 | 15 |
| | Expected Data | Transfer Length | |
| 16<br><br>CDB[0] | 17<br><br>CDB[1] | 18<br><br>CDB[2] | 19<br><br>CDB[3] |
| 20<br><br>CDB[4] | 21<br><br>CDB[5] | 22<br><br>CDB[6] | 23<br><br>CDB[7] |
| 24<br><br>CDB[8] | 25<br><br>CDB[9] | 26<br><br>CDB[10] | 27<br><br>CDB[11] |
| 28<br><br>CDB[12] | 29<br><br>CDB[13] | 30<br><br>CDB[14] | 31<br><br>CDB[15] |
| 32~<br><br>EHS FIELD | | | |

~310

410

| 32 | 33 | 34 | 35 | |
|---|---|---|---|---|
| | The Number | of Fragments | | |
| 36 | 37 | 38 | 39 | |
| | Bytes of Fragment | Reserved | | Reserved |
| 40 | 41 | 42 | 43 | |
| | Frag1: Start | LBA (4B) | | |
| 44 | 45 | 46 | 47 | |
| | Frag1: End | LBA (4B) | | |

510

| 32 | 33 | 34 | 35 |
|----|----|----|----|
| The Number of Fragments | | | |

| 36 | 37 | 38 | 39 |
|----|----|----|----|
| Bytes of Fragment | | Reserved | Reserved |

| 40 | 41 | 42 | 43 |
|----|----|----|----|
| Frag1: Start LBA (4B) | | | |

| 44 | 45 | 46 | 47 |
|----|----|----|----|
| Frag1: End LBA (4B) | | | |

⋮

| 40+LxN-8 | 40+LxN-7 | 40+LxN-6 | 40+LxN-5 |
|----------|----------|----------|----------|
| FragN: Start LBA (4B) | | | |

| 40+LxN-4 | 40+LxN-3 | 40+LxN-2 | 40+LxN-1 |
|----------|----------|----------|----------|
| FragN: End LBA (4B) | | | |

610

| 32 | 33 | 34 | 35 |
|---|---|---|---|
| | The Number of Fragments | | |
| 36 | 37 | 38 | 39 |
| | Bytes of Fragment | Reserved | Reserved |
| 40 | 41 | 42 | 43 |
| | Frag1: Start LBA (2B) | | Frag1: End LBA (2B) |

710

| 32 | 33 | 34 | 35 | |
|---|---|---|---|---|
| | The Number of Fragments | | | |
| 36 | 37 | 38 | 39 | |
| | Bytes of Fragment | | Reserved | Reserved |
| 40 | 41 | 42 | 43 | |
| 44 | 45 | 46 | 47 | |
| | Frag1: Start LBA (8B) | | | |
| 48 | 49 | 50 | 51 | |
| 52 | 53 | 54 | 55 | |
| | Frag1: End LBA (8B) | | | |

810

| 32 | 33 | 34 | 35 |
|---|---|---|---|
| | The Number of Fragments | | |
| 36 | 37 | 38 | 39 |
| | Bytes of Fragment | Reserved | Reserved |
| 40 | 41 | 42 | 43 |
| | Frag1: Start LBA (4B) | | |
| 44 | 45 | 46 | 47 |
| | Frag1: Fragment Size (4B) | | |

910

| 32 | 33 | 34 | 35 |
|---|---|---|---|
| | The Number of Fragments | | |
| 36 | 37 | 38 | 39 |
| | Bytes of Fragment | Reserved | Reserved |
| 40 | 41 | 42 | 43 |
| | Frag1: Start LBA (4B) | | |
| 44 | 45 | 46 | 47 |
| | Frag1: Fragment Size (4B) | | |

⋮

| 40+MxN−8 | 40+MxN−7 | 40+MxN−6 | 40+MxN−5 |
|---|---|---|---|
| | FragN: Start LBA (4B) | | |
| 40+MxN−4 | 40+MxN−3 | 40+MxN−2 | 40+MxN−1 |
| | FragN: Fragment Size (4B) | | |

FIG. 18

STORAGE DEVICE AND PREFETCH METHOD THEREOF

CROSS-REFERENCE TO RELATED APPLICATION

This application claims priority under 35 U.S.C. § 119 to Korean Patent Application No. 10-2023-0071886 filed on Jun. 2, 2023 in the Korean Intellectual Property Office, the contents of which are incorporated herein by reference in their entirety.

BACKGROUND

(a) Field

The inventive concepts relate to storage devices and prefetch methods thereof.

(b) Description of the Related Art

A storage system may include a host and a storage device, and the storage device may include, for example, a non-volatile memory such as a flash memory and a storage controller for controlling the non-volatile memory.

The storage device may provide data stored in the non-volatile memory to a host according to the host's read command. When read commands for successive addresses are received from the host, the storage device may perform a sequential read operation on the non-volatile memory. When performing sequential read operations, the storage controller may improve read performance by prefetching data from the non-volatile memory.

SUMMARY

Some example embodiments may provide a storage device and a prefetch method thereof capable of enhancing read performance by consecutively prefetching a plurality of file fragments.

According to some example embodiments, a storage device may include a non-volatile memory configured to store one file as a plurality of file fragments, and a storage controller configured to receive a read command with respect to the plurality of file fragments from a host through UFS protocol information unit (UPIU), and perform prefetching on the plurality of file fragments based on file fragmentation information included in an extra header segment (EHS) field of the UPIU.

According to some example embodiments, a prefetch method may include receiving a first read command and a second read command from a host, determining whether file fragmentation information of the first read command is valid in response to an address of the first read command and an address of the second read command being consecutive, performing a prefetch based on the file fragmentation information in response to the file fragmentation information being valid, and sending data corresponding to the first read command and data corresponding to the second read command to the host based on a prefetch result.

According to some example embodiments, an electronic device may include a host configured to manage a plurality of fragmentation information with respect to a plurality of file fragments for one file, and generate at least one read command including the plurality of fragmentation information, and a storage device configured to perform prefetching based on the plurality of fragmentation information, and process the at least one read command according to a prefetch result.

BRIEF DESCRIPTION OF THE DRAWINGS

FIG. 3 illustrates a format of a read command of a host according to some example embodiments.

FIG. 18 is a schematic block diagram of a computing system according to some example embodiments.

DETAILED DESCRIPTION

Figure 1:
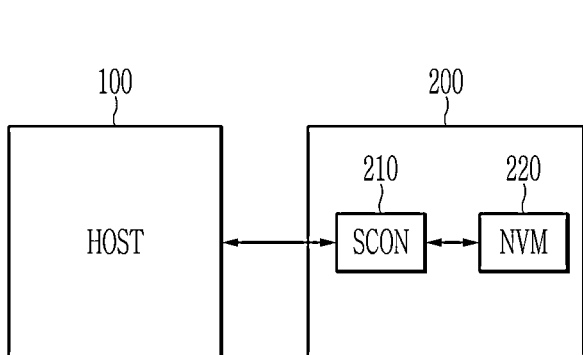
FIG. 1 is a schematic block diagram of an electronic device according to some example embodiments.

In the following detailed description, example embodiments of the inventive concepts will be described more fully hereinafter with reference to the accompanying drawings, in which some example embodiments are shown. As those skilled in the art would realize, the described example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. The sequence of operations or steps are not limited to the order presented in the claims or figures unless specifically indicated otherwise. The order of operations or steps may be changed, several operations or steps may be merged, some operations or steps may be divided, and specific operations or steps may not be performed.

In addition, as used herein, expressions written in the singular may be construed in the singular or plural unless an explicit expression such as "one" or "single" is used. The singular forms "a" and "an" are intended to include the plural form as well, unless the context clearly indicates otherwise. Although the terms including ordinal numbers such as first, second, and the like may be used herein to describe various elements, components, steps and/or operations, these terms are only used to distinguish one element, component, step or operation from another element component, step, or operation, and are not to be interpreted as limiting these components.

FIG. 1 is a schematic block diagram of an electronic device according to some example embodiments.

Referring to FIG. 1, an electronic device (e.g., semiconductor device) 10 according to some example embodiments may be implemented as a personal computer (PC), a data server, a laptop computer, an electrical component for a vehicle, or a portable device. For example, portable devices may be implemented as a mobile phone, a smart phone, a tablet PC, a wearable device, a personal digital assistant (PDA), an enterprise digital assistant (EDA), a digital still camera, a digital video camera, a portable multimedia player (PMP), a personal navigation device (PND) or portable navigation device (PND), a handheld game console, or an e-book, but example embodiments are not limited thereto. In some example embodiments, the electronic device 10 may be implemented as a computing system such as a system-on-chip (SoC).

The electronic device 10 according to some example embodiments may include a host 100 and a storage device (e.g., memory device) 200. The host 100 may communicate with the storage device 200 through various interfaces. The host 100 may request a data processing operation, e.g., a data read operation, a data write (program) operation, and a data erase operation, from the storage device 200, but example embodiments are not limited thereto. For example, the host 100 may be a central processing unit (CPU), a graphic processing unit (GPU), a microprocessor, or an application processor (AP), or the like, but example embodiments are not limited thereto. For example, the host 100 may include or be implemented as processing circuitry such as hardware (e.g., logic circuits) or a combination of hardware and software (e.g., a computer-based electronic system) like a processor executing instruction codes or program routines (e.g., a software program). The instruction codes or the program routines may be stored in any storage device located inside or outside the computer-based electronic system.

The storage device 200 may include a storage controller (SCON) 210 and a non-volatile memory (NVM) 220. The storage device 200 may be implemented as various types of storage devices, such as, for example, a solid-state drive (SSD), an embedded multimedia card (eMMC), a universal flash storage (UFS), a compact flash (CF), a secure digital (SD), a micro secure digital (Micro-SD), a mini secure digital (Mini-SD), an extreme Digital (xD), or a memory stick, but example embodiments are not limited thereto. In some example embodiments, at least a part of the storage controller 210 may include or be implemented as processing circuitry such as hardware (e.g., logic circuits) or a combination of hardware and software (e.g., a computer based electronic system) like a processor executing instruction codes or program routines (e.g., a software program). The instruction codes or the program routines may be stored in any storage device located inside or outside the computer-based electronic system.

In some example embodiments, when the storage device 200 is an SSD, the storage device 200 may be a device conforming to the non-volatile memory express (NVMe) standard. In some example embodiments, when the storage device 200 is an embedded memory or an external memory, the storage device 200 may be a device conforming to the UFS standard or the eMMC standard. In some example embodiments, the host 100 and the storage device 200 may each generate, and may transmit a packet according to an adopted standard protocol.

The storage controller 210 may access the non-volatile memory 220 in response to a request from the host 100. The storage controller 210 may be configured to provide an interface between the non-volatile memory 220 and the host 100. In some example embodiments, the storage controller 210 may be configured to drive firmware for controlling the non-volatile memory 220.

The storage controller 210 may control the operation of the non-volatile memory 220. For example, the storage controller 210 may provide at least one of an address, a command, data, a control signal, or power along an input/output line connected to the non-volatile memory 220. The storage controller 210 may write data to the non-volatile memory 220, erase data from the non-volatile memory 220, or read data from the non-volatile memory 220 using at least one of an address, a command, a control signal, or power. In some example embodiments, the control signal may include chip enable, write enable, read enable, and the like.

The non-volatile memory 220 may be implemented as a NAND flash memory, a vertical NAND flash memory (VNAND), a NOR flash memory, a resistive RAM (RRAM), a phase-change RAM (PRAM), a conductive bridging RAM (CBRAM), a magnetoresistive RAM (MRAM), a ferroelectrics RAM (FRAM), or a spin transfer torque RAM (STT-RAM), or the like, but example embodiments are not limited thereto.

In some example embodiments, the host 100 may request a data read operation by transmitting a read command to the storage device 200. For example, the host 100 may transmit fragmentation information together with the read command to the storage device 200. The fragmentation information may include information on a plurality of file fragments. For example, the fragmentation information may include at least one of the number of file fragments, file fragment range (for example, a start address, an end address, a fragment size (or length)), and/or a field size allocated to a file fragment range. For example, the address may mean a logical block address (LBA). In some example embodiments, the file fragment range may include a start address, an end address, and/or a fragment size (or length), the start address and the end address may refer to logical block addresses (LBAs). In some example embodiments, the storage device 200 may store a plurality of file fragments by fragmenting one file. For example, the plurality of file fragments may have discontinuous addresses different from each other, and one file fragment may include a plurality of data chunks having consecutive addresses. The storage controller 210 may continuously prefetch data of the non-volatile memory 220 based on the fragmentation information.

Figure 2:
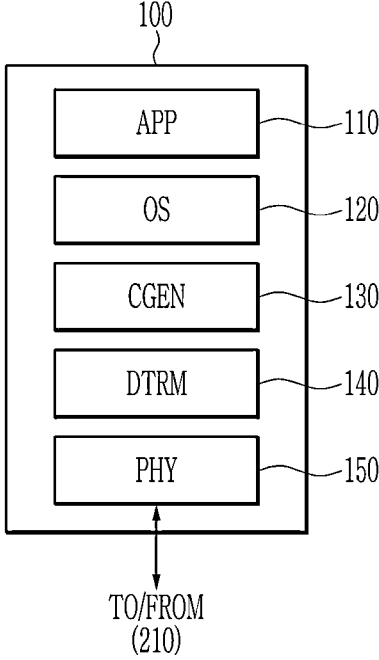
FIG. 2 shows a hierarchical structure of a host according to some example embodiments.

FIG. 2 shows a hierarchical structure of a host according to some example embodiments. FIG. 3 illustrates a format of a read command of a host according to some example embodiments.

Referring to FIG. 2, the host 100 according to some example embodiments may include an application layer (APP) 110, an operating system layer (OS) 120, a command generator layer (CGEN) 130, a data transmission manager layer (DTRM) 140, and a physical layer (PHY) 150.

For example, the application layer 110 may include application programs executed on the host 100. The operating system layer 120 may include a file system. For example, the operating system layer 120 may provide an environment in which application programs of the application layer 110 are executed. For example, the application layer 110 may request the fragmentation information from the operating system layer 120. In some example embodiments, the fragmentation information may include information about the plurality of file fragments into which one file is fragmented. For example, the fragmentation information may include at least one of the number of file fragments, file fragment range (for example, start address, end address, fragment size, and the like), or field size allocated to a file fragment range with respect to the one file. The application layer 110 may obtain the fragmentation information from the operating system layer 120 and transfer the fragmentation information to the command generator layer 130.

The command generator layer 130 may generate a command processable by the storage device 200 of FIG. 1. In some example embodiments, the command generator layer 130 may include a device driver for controlling the storage device 200. For example, the command generator layer 130 may generate a command in a format interpretable by the storage device 200. For example, the command generator layer 130 may generate the read command based on the fragmentation information.

In some example embodiments, the command generator layer 130 may transmit a command to the storage device 200 by using the PHY layer 150. The storage device 200 may perform a data processing operation based on the command.

The PHY layer 150 may transmit an electrical signal to the storage controller 210 of the storage device 200, or receive an electrical signal from the storage controller 210. The PHY layer 150 may transmit a command by using an electrical signal. In some example embodiments, the storage controller 210 may include a PHY layer, and the storage controller 210 may transmit and receive an electrical signal by using the PHY layer.

In some example embodiments, the host 100 may transmit data together with a command to the storage device 200. For example, the data transmission manager layer 140 may receive a command from the command generator layer 130 and receive data from the application layer 110. The data transmission manager layer 140 may generate a packet based on a command and data. The data transmission manager layer 140 may transmit a packet by using the PHY layer 150. The PHY layer 150 may transmit a packet by using an electrical signal.

Referring also to FIG. 3, the host 100 according to some example embodiments may generate the read command 300 according to interface protocol proposed by the Joint Electron Device Engineering Council (JEDEC). The read command 300 may be transferred to the storage device 200 through a UFS protocol information unit (UPIU). For example, the storage device 200 may be implemented as a universal flash storage (UFS). The host 100 may generate the read command 300 based on the format as shown, for example, in FIG. 3 to be interpretable by the storage device 200.

According to some example embodiments, the read command 300 may include a plurality of fields. Each field of the read command 300 is referred to using a number as illustrated in FIG. 3, for example, 0-32. Each field of the read command 300 may include 1 byte of data.

For example, fields 0 to 11 of the read command 300 may correspond to a basic header format. The basic header format may be a format included in all UPIU structures. For example, field 0 of the read command 300 may include information about a transaction type and/or code. For example, the transaction type and/or code allocated to the read command 300 may be 'xx00 0001b'.

For example, field 1 of the read command 300 may include information about a flag or multiple flags. For example, field 1 of the read command 300 may include a flag indicating that a data read operation from the host 100 is requested, a flag indicating that a data write operation from the host 100 is requested, and the like, but example embodiments are not limited thereto.

In some example embodiments, field 2 of the read command 300 may include information about a logical unit number (LUN) of the storage device 200.

In some example embodiments, field 3 of the read command 300 may include information about a task tag.

In some example embodiments, a portion (for example, 4 bit) of field 4 of the read command 300 may include an identity of initiator device (IID), and a portion (for example, 4 bit) of field 4 may include information about a command set (CS) type. For example, command set (CS) type may include a small computer system interface (SCSI) command set, a UFS specific command set, a vendor-specific command set, and the like, but example embodiments are not limited thereto. In some example embodiments, rules for managing the fragmentation information may be predetermined according to vendors using the host 100 and the storage device 200. For example, the host 100 may generate the read command 300 including a vendor-specific command set related to the fragmentation information according to a rule determined in the command set (CS) type of field 4. In some example embodiments, the host 100 may generate the read command 300 including a vendor-specific command set related to the fragmentation information in the extra header segment (EHS) field 310.

In some example embodiments, field 8 of the read command 300 may include information about an entire or total length of an extra header segment (EHS).

In some example embodiments, fields 10 and 11 of the read command 300 may represent data segment length which includes information about the number of valid bytes of the data segment.

In some example embodiments, fields 12 to 31 of the read command 300 are 20 bytes and may include information about a transaction code, but example embodiments are not limited thereto. For example, fields 12 to 31 of the read command 300 may be 20 bytes or more. For example, fields 12 to 15 of the read command 300 may include information about an expected data transfer length. For example, fields 16 to 31 of the read command 300 may be allocated as a command descriptor block (CDB). For example, fields 16 to 31 of the read command may be allocated as a command descriptor block (CDB) including CDB [0] to CDB [15]. The CDB may be defined by a UFS command set type.

In some example embodiments, fields after field 32 of the read command 300 may be allocated as the EHS field 310. For example, the command generator layer 130 may generate the read command 300 by including the fragmentation information in the EHS field 310. An example configuration in which the command generator layer 130 generates the read command 300 by including the fragmentation information in the EHS field 310 according to some example embodiments will be described later with reference to FIG. 4 to FIG. 9.

Figure 4:
FIG. 4 to FIG. 9 show examples of a format of an EHS field according to some example embodiments.

FIG. 4 shows an example of a format of an EHS field of according to some example embodiments.

Referring to FIG. 4, a host 100 according to some example embodiments may generate the read command 300 including an EHS field 410 based on the fragmentation information. In some example embodiments, the EHS field 410 may include fields 32 through 47.

For example, fields 32 to 35 of the EHS field 410 are 4 bytes, and may include information about the number of file fragments constituting one file. In some example embodiments, fields 32 to 35 of the EHS field 410 may be 4 bytes or greater. According to some example embodiments, the storage device 200 may store a plurality of file fragments constituting one file. For example, since the plurality of file fragments have discontinuous addresses (e.g., LBA), a discontinuous section may exist between an end address of one file fragment and a start address of a subsequent file fragment. For example, individual file fragments may have consecutive addresses between a start address and an end address.

For example, fields 36 and 37 of the EHS field 410 are 2 bytes in total, and may include information about a size (e.g., in bytes) of a start address and end address of a unit file fragment (e.g., one file fragment). For example, the host 100 may generate the read command 300 by allocating 4 bytes to a start address and 4 bytes to an end address. The host 100 may include information about 8 bytes in fields 36 and 37. For example, the host 100 may include information about the size of the start address and the end address of unit file fragment (e.g., one file fragment) in fields 36 and 37.

In some example embodiments, fields 40 to 43 of the EHS field 410 are 4 bytes in total, and may include information about a start address of a first file fragment Frag1 from among the plurality of file fragments. In some example embodiments, fields 44 to 47 of the EHS field 410 are 4 bytes in total, and may include information about an end address of the first file fragment Frag1 from among the plurality of file fragments. For example, the storage device 200 may determine a start point and an end point of the first file fragment Frag1 based on the start address and the end address of the first file fragment Frag1 of the EHS field 410, and performs prefetching on the first file fragment Frag1.

According to some example embodiments, the host 100 may decrease latency with respect to the read command 300 by transmitting the read command 300 including fragmentation information with respect to the first file fragment Frag1 from among the plurality of file fragments to the storage device 200. In some example embodiments, since the storage device 200 performs prefetching based on the fragmentation information, a prefetch hit rate and sequential read performance of the storage device 200 may be improved.

Figure 5:

FIG. 5 shows an example of a format of an EHS field according to some example embodiments.

Referring to FIG. 5, a host 100 according to some example embodiments may generate the read command 300 including an EHS field 510 based on the fragmentation information. According to some example embodiments, the EHS field 510 may include fields 32 through 40+L*N−1. For example, N represents the number of file fragments and the number of file fragments may be indicated in fields 32 to 35. L represents a field size (e.g., in bytes) allocated to the start address and end address of the file fragment and may be indicated in fields 36 and 37. L and N may be integers greater than 1.

For example, the contents of the EHS field 410 described with reference to FIG. 4 may be equally applied to fields 32 to 47 of the EHS field 510. Accordingly, a duplicated description is not included here again.

According to some example embodiments, EHS field 510 may include the fragmentation information about N file fragments. For example, the host may include the start address (Start LBA) and end address (End LBA) of a first file fragment Frag1 among the N file fragments in fields 40 to 47, and may include a start address (Start LBA) and an end address (End LBA) of a N-th file fragment FragN among the N file fragments in the field 40+L*N−8 to 40+L*N−1. According to some example embodiments, storage device 200 may determine a start point and an end point of each of the N file fragments based on the start addresses and end addresses of the N file fragments of EHS field 510, and performs prefetching on the N file fragments.

Although it has been described with reference to FIG. 5 that, in some example embodiments, the host generates the read command 300 by including the fragmentation information with respect to all the N file fragments in the EHS field 510, example embodiments are not necessarily limited thereto, and, in some example embodiments, the host 100 may generate the read command 300 by including the fragmentation information with respect to p file fragments (e.g., p is an integer larger than 1 and smaller than N) among the N file fragments in the EHS field 510. For example, fields 32 to 35 may include information about N (e.g., number of file fragments), fields 36 and 37 include information about L (e.g., field size (e.g., in bytes) allocated to the start address and end address of the file fragment), and a last field of the EHS field 510 may be field 40+L*p−1.

In some example embodiments, as the host 100 transmits the read command 300 including the fragmentation information with respect to the plurality of file fragments to the storage device 200, the storage device 200 may perform prefetching based on the fragmentation information, and accordingly a prefetch hit rate and sequential read performance may be improved.

Figure 6:

FIG. 6 shows an example of a format of an EHS field according to some example embodiments.

Referring to FIG. 6, a host 100 according to some example embodiments may generate the read command 300 including an EHS field 610 based on the fragmentation information. In some example embodiments, EHS field 610 may include fields 32 through 43.

In some example embodiments, the contents of the EHS field 410 described with reference to FIG. 4 may be equally applied to fields 32 to 39 of EHS field 610. Accordingly, duplicated description is not included here again.

In some example embodiments, fields 40 and 41 of the EHS field 610 are 2 bytes in total, and may include information about the start address (Start LBA) of a first file fragment Frag1 among the plurality of file fragments. In some example embodiments, fields 42 and 43 of the EHS field 610 are 2 bytes in total, and may include information about the end address (End LBA) of the first file fragment Frag1 among the plurality of file fragments. For example, the fields 36 and 37 of EHS field 610 are 2 bytes, and may include information about 4 bytes, which is the size of the start address and the end address of a unit file fragment. The storage device 200 may determine a start point and an end point of the first file fragment Frag1 based on the start address and end address of the first file fragment Frag1 of the EHS field 610, and perform prefetching on the first file fragment Frag1.

According to some example embodiments, the host 100 may decrease latency with respect to the read command 300 by transmitting the read command 300 including the fragmentation information with respect to the first file fragment Frag1 among the plurality of file fragments to the storage device 200. In some example embodiments, since the storage device 200 performs prefetching based on the fragmentation information, a prefetch hit rate and sequential read performance may be improved.

Although it has been described with reference to FIG. 6 that, in some example embodiments, the host generates the read command including the fragmentation information with respect to the first file fragment among the plurality of file fragments, example embodiments are not necessarily limited thereto, and, in some example embodiments, the host may generate a read command including fragmentation information with respect to some or all of the plurality of file fragments.

Figure 7:

FIG. 7 shows an example of a format of an EHS field according to some example embodiments.

Referring to FIG. 7, a host 100 according to some example embodiments may generate the read command 300 including an EHS field 710 based on the fragmentation information. The EHS field 710 may include fields 32 through 55.

In some example embodiments, contents of the EHS field 410 described with reference to FIG. 4 may be equally applied to the fields 32 to 39 of the EHS field 710. Accordingly, duplicated description is not included here again.

In some example embodiments, fields 40 to 47 of EHS field 710 are 8 bytes in total, and may include information about the start address (Start LBA) of a first file fragment Frag1 among the plurality of file fragments. In some example embodiments, fields 48 to 55 of EHS field 710 are 8 bytes, and may include information about the end address (End LBA) of a first file fragment Frag1 among the plurality of file fragments. For example, fields 36 and 37 of EHS field 710 are 2 bytes in total, and may include information about 16 bytes, which is the size of the start address (Start LBA) and the end address (End LBA) of a unit file fragment. The storage device 200 may determine a start point and an end point of the first file fragment Frag1 based on the start address (Start LBA) and end address (End LBA) of the first file fragment Frag1 of the EHS field 710, and perform prefetching on the first file fragment.

According to some example embodiments, the host 100 may decrease latency with respect to the read command 300 by transmitting the read command 300 including the fragmentation information with respect to the first file fragment Frag1 among the plurality of file fragments to the storage device 200. In some example embodiments, since the storage device 200 performs prefetching based on the fragmentation information, a prefetch hit rate and sequential read performance may be improved.

Although it has been described with reference to FIG. 7 that, in some example embodiments, the host generates the read command 300 including the fragmentation information with respect to the first file fragment Frag1 among the plurality of file fragments, example embodiments are not necessarily limited thereto, and, in some example embodiments, the host 100 may generate a read command 300 including fragmentation information with respect to some or all of the plurality of file fragments.

For example, the host 100 may generate the read command 300 by allocating address information to fields of various sizes, and example embodiments are not limited to 2 bytes, 4 bytes, or 8 bytes.

Figure 8:

FIG. 8 shows an example of a format of an EHS field of according to some example embodiments.

Referring to FIG. 8, a host 100 according to some example embodiments may generate the read command 300 including an EHS field 810 based on the fragmentation information. The EHS field 810 may include fields from field 32 to field 47.

In some example embodiments, the contents of the EHS field 410 described with reference to FIG. 4 may be equally applied to the fields 32 to 39 of the EHS field 810. Accordingly, duplicated description is not included here again.

In some example embodiments, fields 40 to 43 of the EHS field 810 are 4 bytes in total, and may include information about the start address (Start LBA) of a first file fragment Frag1 among the plurality of file fragments. In some example embodiments fields 44 to 47 of the EHS field 810 are 4 bytes, and may include information with respect to a size of the first file fragment Frag1 among the plurality of file fragments. For example, fields 36 and 37 of the EHS field 810 are 2 bytes in total, and may include information about 8 bytes, which is a size of a field allocated to a start address of a unit file fragment and a size of a file fragment. The storage device may determine a start point and an end point of the first file fragment Frag1 based on start address and size of the first file fragment Frag1 of the EHS field 810, and perform prefetching on the first file fragment Frag1.

According to some example embodiments, the host 100 may decrease latency with respect to the read command 300 by transmitting the read command 300 including the fragmentation information with respect to the first file fragment Frag1 among the plurality of file fragments to the storage device 200. In some example embodiments, since the storage device 200 performs prefetching based on the fragmentation information, a prefetch hit rate and sequential read performance may be improved.

Although it has been described with reference to FIG. 8 that, in some example embodiments, the host 100 generates the read 300 command including the fragmentation information with respect to the first file fragment Frag1 among the plurality of file fragments, example embodiments are not necessarily limited thereto, and the host 100 may generate a read command 300 including fragmentation information with respect to some or all of the plurality of file fragments.

For example, although it has been described with reference to FIG. 8 that, in some example embodiments, the field size allocated to the start address and the field size allocated to a file fragment size are the same as 4 bytes, example embodiments are not necessarily limited thereto, and, in some example embodiments, the host 100 may generate a read command 300 such that a field size allocated to the start address and a field size allocated to the file fragment size may be different.

Figure 9:

FIG. 9 shows an example of a format of an EHS field according to some example embodiments.

Referring to FIG. 9, a host 100 according to some example embodiments may generate the read command 300 including an EHS field 910 based on the fragmentation information. The EHS field 910 may include fields from field 32 to field 40+M*N-1. For example, N represents the number of file fragments constituting one file and may be indicated in fields 32 to 35. M represents the field size assigned to the starting address and size of the file fragment and may be indicated in fields 36 and 37. M and N may be integers greater than 1.

In some example embodiments, the contents of the EHS field 810 described with reference to FIG. 8 may be equally applied to the fields 32 to 47 of the EHS field 910. Accordingly, duplicated description is not included here again.

In some example embodiments, EHS field 910 may include the fragmentation information about the N file fragments. For example, the host 100 may include start address (Start LBA) and size of the first file fragment Frag1 among the N file fragments in fields 40 to 47, and include start address (Start LBA) and size of the N-th file fragment FragN among the N file fragments in the field 40+M*N-8 to 40+M*N-1. Fields 36 and 37 of the EHS field 910 are 2 bytes in total, and may include information about 8 bytes, which is a size of a field allocated to a start address of a unit file fragment and a size of a file fragment. The storage device 200 may determine a start point and an end point of each of the N file fragments based on start addresses and sizes of the N file fragments of the EHS field 910, and perform prefetching on the N file fragments.

Although it has been described with reference to FIG. 9 that, in some example embodiments, the host 100 generates the read command 300 by including the fragmentation information with respect to all the N file fragments in the EHS field 910, example embodiments are not necessarily limited thereto, and the host 100 may generate the read command 300 by including the fragmentation information with respect to p file fragments (for example, p is an integer larger than 1 and smaller than N) among the N file fragments in the EHS field 910. For example, fields 32 to 35 may include information about N, fields 36 and 37 may include information about M, and a last field of the EHS field 910 may be the field 40+M*p−1.

For example, although it has been described with reference to FIG. 9 that, in some example embodiments, the field size allocated to the start address and the field size allocated to a file fragment size are the same as 4 bytes, example embodiments are not necessarily limited thereto, and the host 100 may generate a read command 300 such that a field size allocated to the start address and a field size allocated to the file fragment size may be different.

According to some example embodiments, the host 100 may decrease latency with respect to the read command 300 by transmitting the read command 300 including the fragmentation information with respect to the first file fragment Frag1 among the plurality of file fragments to the storage device 200. In some example embodiments, since the storage device 200 performs prefetching based on the fragmentation information, a prefetch hit rate and sequential read performance may be improved.

Figure 10:
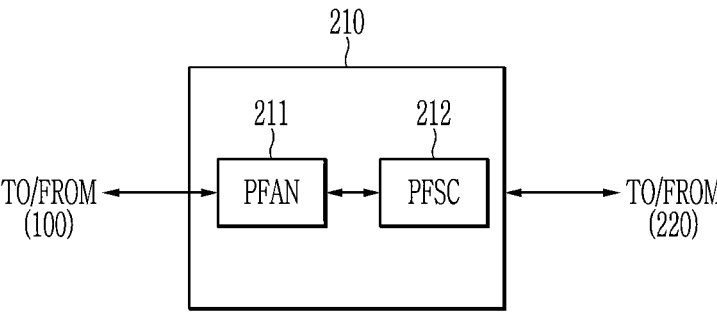
FIG. 10 is a block diagram of a storage controller according to some example embodiments.
Figure 11:
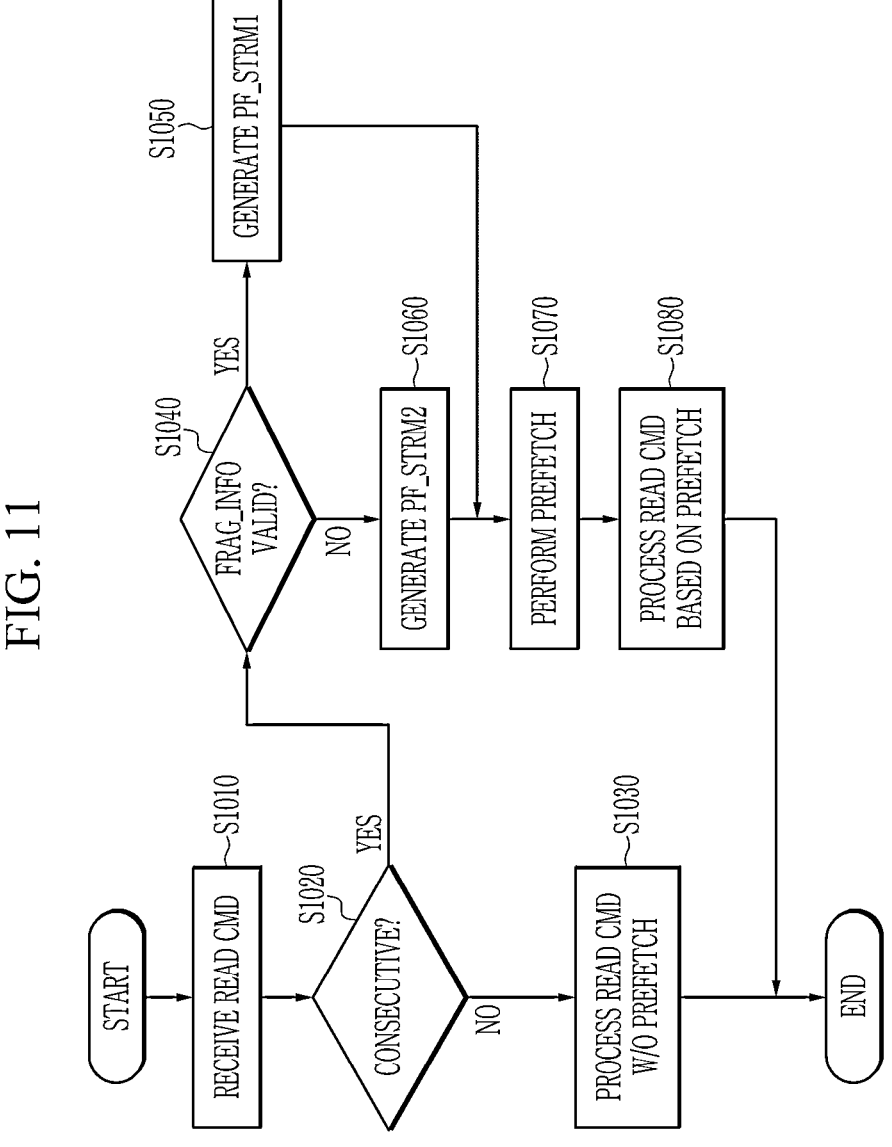
FIG. 11 is a flowchart for showing an operation of a storage controller according to some example embodiments.

FIG. 10 is a block diagram of a storage controller according to some example embodiments. FIG. 11 is a flowchart for showing an operation of a storage controller according to some example embodiments.

Referring to FIG. 10 and FIG. 11, the storage controller 210 according to some example embodiments may communicate with the host 100 and the non-volatile memory 220. For example, the storage controller 210 may receive the read command 300 from the host 100, and transmit a signal (for example, read data) to the host 100 in response to the read command 300. The storage controller 210 may schedule prefetching based on the read command 300. The storage controller 210 may instruct the non-volatile memory 220 to perform the scheduled prefetching. The non-volatile memory 220 may perform prefetching based on the scheduled prefetching, and read the stored data and transmit it to the storage controller 210.

The storage controller 210 according to some example embodiments may include a prefetch analyzer (PFAN) 211 and a prefetch scheduler (PFSC) 212.

As illustrated in FIG. 11, in some example embodiments, in operation S1010, the prefetch analyzer 211 may receive the read command 300 from the host 100. In some example embodiments, the prefetch analyzer 211 may receive a plurality of the read commands.

In operation S1020, the prefetch analyzer 211 may determine whether the plurality of the read commands are consecutive. For example, the prefetch analyzer 211 may determine whether the plurality of the read commands have sequential pattern. The plurality of the read commands may include an address and a chunk size. For example, in the read command, an address may be a logical block address (LBA) of data to be read, and a chunk size may be a size of the data to be read.

In some example embodiments, when two read commands are consecutive, the prefetch analyzer 211 may determine that the plurality of the read commands are consecutive in operation S1020. For example, the host 100 may transmit a first read command and a second read command subsequent to the first read command to the prefetch analyzer 211. For example, the first read command may include first address and first chunk size, and the second read command may include second address and second chunk size. The first address may be a logical block address (LBA) of the position in the non-volatile memory 220 storing data corresponding to the first read command, and the first chunk size may be a size of the data corresponding to the first read command. According to some example embodiments, the description of the first address and the first chunk size may be applied to the second address and the second chunk size. The prefetch analyzer 211 may determine in operation S1020 that the first and second read commands are consecutive when the first address and the second address are consecutive. For example, the prefetch analyzer 211 may determine that the first and second read commands are consecutive in operation S1020 when the second address is equal to a sum of the first address and the first chunk size.

In some example embodiments, when r number of read commands (e.g., r is a predetermined integer greater than 2) are consecutive, the prefetch analyzer 211 may determine that the plurality of the read commands are consecutive in operation S1020. For example, r is 3, and the host 100 may consecutively transmit the first read command, the second read command, and a third read command to the prefetch analyzer 211. Each of the first to third read commands may include first to third addresses and first to third chunk sizes. In some example embodiments, when a sum of the first address and the first chunk size is equal to the second address, and a sum of the second address and the second chunk size is equal to the third address, the prefetch analyzer 211 may determine that the first to third read commands are consecutive in operation S1020. According to some example embodiments, the host 100 may use a different chunk size for each of the read commands or a fixed chunk size. For example, when the host 100 uses the fixed chunk size, the first to third chunk sizes may all be the same.

In some example embodiments, when the prefetch analyzer 211 determines, in operation S1020, that the plurality of the read commands are not consecutive, the storage controller 210 may process the read command in operation S1030. For example, the prefetch analyzer 211 may not schedule a prefetch and the prefetch scheduler 212 may not perform a prefetch. For example, the storage controller 210 may read data from the non-volatile memory 220 and transmit the data to the host 100 without prefetching.

In some example embodiments, when the prefetch analyzer 211 determines, in operation S1020, that the plurality of the read commands are consecutive, the prefetch analyzer 211 may determine, in operation S1040, whether the fragmentation information FRAG_INFO is valid. The host 100 may include the fragmentation information FRAG_INFO in at least one of the consecutive plurality of the read commands. In some example embodiments, the fragmentation information FRAG_INFO may be included in an EHS field of the read command. The fragmentation information FRAG_INFO may include at least one of the number of file fragments, file fragment range (for example, start address, end address, fragment size, and the like), or field size allocated to a file fragment range with respect to the one file. The prefetch analyzer 211 may perform analysis of the fragmentation information FRAG_INFO included in at least one of the plurality of the read commands determined to be consecutive. In some example embodiments, when the fragmentation information FRAG_INFO may not be analyzed due to a reason such as wrong or incorrect format, the prefetch analyzer 211 may determine, in operation S1040, that the fragmentation information FRAG_INFO is not valid. In some example embodiments, when the fragmentation information FRAG_INFO includes information unrelated to a current operation, the prefetch analyzer 211 may determine, in operation S1040, that the fragmentation information FRAG_INFO is not valid. For example, information unrelated to the current operation may include information with respect to the prefetch already performed by the storage controller 210, but example embodiments are not limited thereto and information unrelated to the current operation may include other information. In some example embodiments, prefetch analyzer 211 may determine, in operation S1040, whether a file fragment range (for example, a start address, an end address, a fragment size, and the like) included in the fragmentation information FRAG_INFO is valid based on at least one of information about the number of file fragments and information about a field size allocated to a file fragment range included in the fragmentation information FRAG_INFO.

In some example embodiments, when the prefetch analyzer 211 determines, in operation S1040, that the fragmentation information FRAG_INFO is valid, the prefetch analyzer 211 may generate, in operation S1050, a first prefetch stream PF_STRM1. For example, the prefetch analyzer 211 may generate, in operation S1050, the first prefetch stream PF_STRM1 based on the range of file fragment of the fragmentation information FRAG_INFO. For example, the prefetch analyzer 211 may determine a prefetch start address and a prefetch end address based on start address and end address of the file fragment of the fragmentation information FRAG_INFO. For example, the prefetch analyzer 211 may determine the prefetch start address and the prefetch end address based on start address and fragment size of the file fragment of the fragmentation information FRAG_INFO. The prefetch analyzer 211 may generate, in operation S1050, the first prefetch stream PF_STRM1 based on the prefetch start address and the prefetch end address.

In some example embodiments, when the prefetch analyzer 211 determines, in operation S1040, that the fragmentation information FRAG_INFO is not valid, the prefetch analyzer 211 may generate, in operation S1060, a second prefetch stream PF_STRM2. In some example embodiments, the prefetch analyzer 211 may generate, in operation S1060, the second prefetch stream PF_STRM2 based on address of the read command. In some example embodiments, the prefetch analyzer 211 may determine the prefetch start address based on start address of file fragment of the fragmentation information FRAG_INFO. The prefetch analyzer 211 may generate, in operation S1060, the second prefetch stream PF_STRM2 based on the prefetch start address. The prefetch analyzer 211 may not determine the prefetch end address. In some example embodiments, when the host 100 transmits the read command including the valid fragmentation information FRAG_INFO, the prefetch analyzer 211 may generate a new prefetch stream.

The prefetch analyzer 211 may transmit the generated prefetch stream PF_STRM1 or PF_STRM2, generated in operation S1050 and S1060 respectively, to the prefetch scheduler 212. The prefetch scheduler 212, in operation S1070, may perform prefetching based on the prefetch stream PF_STRM1 or PF_STRM2 S1070. For example, the prefetch scheduler 212 may perform prefetching, in operation S1070, from the prefetch start address to the prefetch end address based on the first prefetch stream PF_STRM1 generated in operation S1050. For example, the prefetch scheduler 212 may perform prefetching, in operation S1070, from the prefetch start address based on the second prefetch stream PF_STRM2 generated in operation S1060. For example, the prefetch scheduler 212 may perform prefetching, in operation S1070, until a new prefetch stream is received.

In operation S1080, the storage controller 210 may process the read command based on the prefetch result. For example, the storage controller 210 may transmit the data prefetched from the non-volatile memory 220 by the prefetch scheduler 212 to the host 100, in response to the read command.

Figure 12:
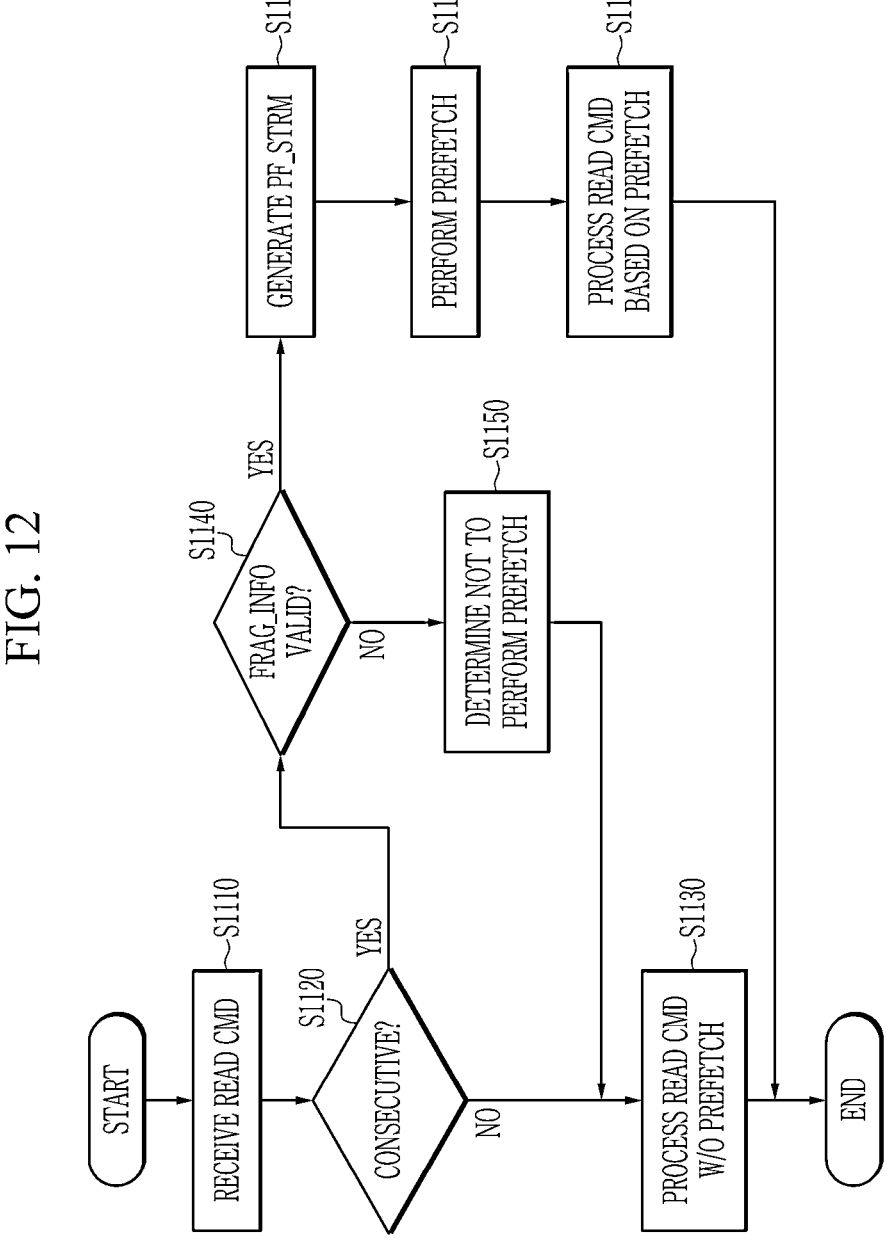
FIG. 12 is a flowchart for showing an operation of a storage controller according to some example embodiments.

FIG. 12 is a flowchart for showing an operation of a storage controller according to some example embodiments.

Referring to FIG. 10 and FIG. 12, the storage controller 210 according to some example embodiments may communicate with the host 100 and the non-volatile memory 220. For example, the storage controller 210 may receive the read command from the host 100, and transmit a signal (for example, read data) to the host 100 in response to the read command. The storage controller 210 may schedule prefetching based on the read command. The storage controller 210 may instruct the non-volatile memory 220 to perform the scheduled prefetching. The non-volatile memory 220 may perform prefetching based on the scheduled prefetching, and read the stored data and transmit it to the storage controller 210.

The storage controller 210 according to some example embodiments may include the prefetch analyzer (PFAN) 211 and the prefetch scheduler (PFSC) 212. The series of operations S1110, S1120, S1140, S1160, S1170, and S1180 performed by the prefetch analyzer 211 and the prefetch scheduler 212 in FIG. 12 may be the same as the series of operations S1010, S1020, S1040, S1050, S1070, and S1080 described with reference to FIG. 11. Accordingly, hereinafter, the series of operations S1110, S1120, S1140, S1150, and S1130 will be described below.

In operation S1110, the prefetch analyzer 211 may receive the read command from the host 100. In operation S1120, the prefetch analyzer 211 may determine whether the plurality of the read commands are consecutive. For example, the prefetch analyzer 211 may determine whether the plurality of the read commands have sequential pattern. For example, when the prefetch analyzer 211 determines, in operation S1120, that the plurality of the read commands are consecutive, the prefetch analyzer 211 may determine, in operation S1140, whether the fragmentation information FRAG_INFO is valid.

In some example embodiments, when the prefetch analyzer 211 determines, in operation S1140, that the fragmentation information FRAG_INFO is not valid, the prefetch analyzer 211 may determine not to perform prefetching in operation S1150. For example, the prefetch scheduler 212 may not perform prefetching. For example, in operation S1130, the storage controller 210 may process the read command without prefetching. For example, the storage controller 210 may read data from the non-volatile memory 220 without prefetching, and transmit the read data to the host 100. In some example embodiments, operation S1150 may be omitted. For example, when the prefetch analyzer 211 determines, in operation S1140, that the fragmentation information FRAG_INFO is not valid, the storage controller 210 may process the read command without prefetching, in operation S1130.

Figure 13:
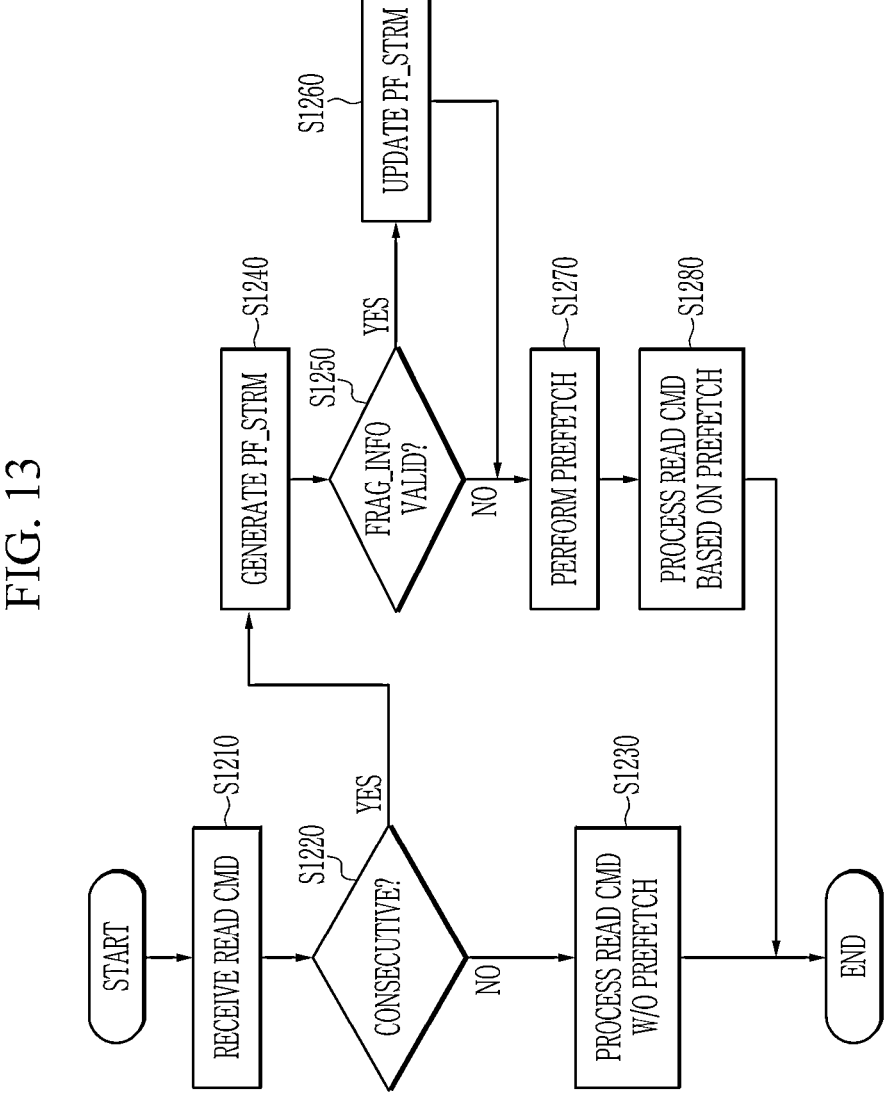
FIG. 13 is a flowchart for showing an operation of a storage controller according to some example embodiments.

FIG. 13 is a flowchart for showing an operation of a storage controller according to some example embodiments.

Referring to FIG. 10 and FIG. 13, the storage controller 210 according to some example embodiments may communicate with the host 100 and the non-volatile memory 220. For example, the storage controller 210 may receive the read command from the host 100, and transmit a signal (for example, read data) to the host 100 in response to the read command. The storage controller 210 may schedule prefetching based on the read command. The storage controller 210 may instruct the non-volatile memory 220 to perform the scheduled prefetching. The non-volatile memory 220 may perform prefetching based on the scheduled prefetching, and read the stored data and transmit it to the storage controller 210.

The storage controller 210 according to some example embodiments may include the prefetch analyzer (PFAN) 211 and the prefetch scheduler (PFSC) 212. The series of operations S1210 to S1230 performed by the prefetch analyzer 211 and the prefetch scheduler 212 in FIG. 13 may be the same as the series of operations S1010 to S1030 described with reference to FIG. 11. Accordingly, hereinafter, the series of operations S1210, S1220, and S1240 to S1280 will be described below.

In operation S1210, the prefetch analyzer 211 may receive the read command from the host 100. In operation S1220, the prefetch analyzer 211 may determine whether the plurality of the read commands are consecutive. For example, the prefetch analyzer 211 may determine whether the plurality of the read commands have sequential pattern.

In some example embodiments, when the prefetch analyzer 211 determines, in operation S1220, that the plurality of the read commands are consecutive, the prefetch analyzer 211 may generate the prefetch stream PF_STRM in operation S1240. For example, the prefetch analyzer 211 may generate the prefetch stream PF_STRM in operation S1240 based on the range of file fragment of the fragmentation information FRAG_INFO included in the read command. In some example embodiments, the prefetch analyzer 211 may generate the prefetch stream PF_STRM in operation S1240 based on the address of the read command. In some example embodiments, the prefetch analyzer 211 may determine the prefetch start address based on the start address of file fragment of the fragmentation information FRAG_INFO. The prefetch analyzer 211 may generate the prefetch stream PF_STRM in operation S1240 based on the prefetch start address.

In operation S1250, the prefetch analyzer 211 may determine whether the fragmentation information FRAG_INFO is valid. Since the description of the operation S1040 in FIG. 10 is equally applied to the operation of determining whether the fragmentation information FRAG_INFO is valid by the prefetch analyzer 211, a duplicate description will be omitted.

In some example embodiments, when the prefetch analyzer 211 determines that the fragmentation information FRAG_INFO is valid in operation S1250, the prefetch analyzer 211 may update the prefetch stream PF_STRM, in operation S1260. For example, the prefetch analyzer 211 may update the prefetch stream PF_STRM in operation S1260 based on the range of file fragment of the fragmentation information FRAG_INFO. For example, the prefetch analyzer 211 may determine the prefetch start address and the prefetch end address based on the start address and end address of the file fragment of the fragmentation information FRAG_INFO. For example, the prefetch analyzer 211 may determine the prefetch start address and the prefetch end address based on the start address and fragment size of the file fragment of the fragmentation information FRAG_INFO. The prefetch analyzer 211 may update the prefetch stream PF_STRM in operation S1260 based on the prefetch start address and the prefetch end address. For example, the prefetch analyzer 211 may update, in operation S1260, the prefetch start address of the prefetch stream PF_STRM generated in operation S1240 based on the start address of the file fragment of the fragmentation information FRAG_INFO, and may update, in operation S1260, the prefetch end address of the prefetch stream PF_STRM based on the end address of the file fragment of the fragmentation information FRAG_INFO. The prefetch analyzer 211 may transmit the prefetch stream PF_STRM to the prefetch scheduler 212.

The prefetch scheduler 212 may perform prefetching based on the prefetch stream PF_STRM in operation S1270. For example, when the fragmentation information FRAG_INFO is valid, the prefetch scheduler 212 may perform prefetching from the prefetch start address to the prefetch end address based on the updated prefetch stream PF_STRM in operation S1270. For example, when the fragmentation information FRAG_INFO is not valid, the prefetch scheduler 212 may perform prefetching from the prefetch start address based on the prefetch stream PF_STRM that has not been updated.

In operation S1280, the storage controller 210 may process the read command based on the prefetch result. For example, the storage controller 210 may transmit the data prefetched from the non-volatile memory 220 by the prefetch scheduler 212 to the host 100, in response to the read command.

Figure 14:
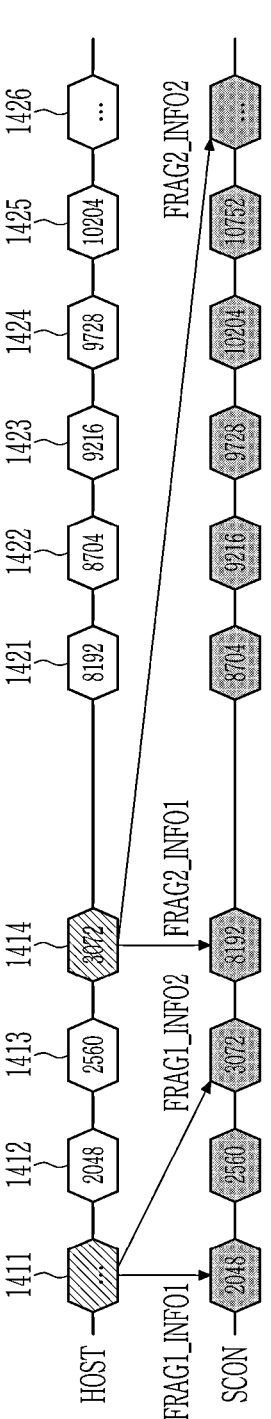
FIG. 14 is a timing diagram for showing an operation of a host and a storage controller according to some example embodiments.

FIG. 14 is a timing diagram for showing an operation of a host and a storage controller according to some example embodiments.

Referring to FIG. 14, a host HOST according to some example embodiments may transmit the read commands 1411-1414 and 1421-1426 to the storage controller SCON of the storage device. The storage device may include the non-volatile memory controlled by the storage controller SCON and the storage controller SCON. The non-volatile memory may fragment one file and store it as a plurality of file fragments. The host HOST may generate the read commands 1411-1414 and 1421-1426 based on the address information with respect to the plurality of file fragments. For example, the read commands 1411 to 1414 may correspond to the first file fragment among the plurality of file fragments, and the read commands 1421 to 1426 may correspond to a second file fragment among the plurality of file fragments. The host HOST may generate the read commands 1411 to 1414 including consecutive addresses in order to read the first file fragment, and generate the read commands 1421 to 1426 including consecutive addresses in order to read the second file fragment. In some example embodiments, since the first file fragment and the second file fragment are discontinuous, a discontinuity may occur between the read command 1414 and the read command 1421. The host HOST may designate a predetermined chunk size when generating each of the read commands 1411-1414 and 1421-1426. The chunk size may be a size of data to be read from the non-volatile memory for one read command. For example, the chunk size is 512 KB (kilo-byte), and the read commands 1411-1414 and 1421-1426 may indicate to read 512 KB from the designated addresses (for example, 2048, 2560, . . . , 9728, 10204), respectively.

The host HOST may generate the read command 1411 including the fragmentation information FRAG1_INFO1 and FRAG1_INFO2 with respect to the first file fragment. In some example embodiments, the fragmentation information FRAG1_INFO1 may indicate the start address of the first file fragment, and the fragmentation information FRAG1_INFO2 may indicate the end address of the first file fragment. In some example embodiments, the fragmentation information FRAG1_INFO1 may indicate the start address of the first file fragment, and the fragmentation information FRAG1_INFO2 may indicate the fragment size of the first file fragment.

The host HOST may transmit the read command 1411 to the storage controller SCON. The storage controller SCON may generate prefetch stream based on the fragmentation information FRAG1_INFO1 and FRAG1_INFO2. The host HOST may generate the prefetch stream by using a predetermined prefetch size. In some example embodiments, prefetch size may be determined based on the chunk size. For example, the prefetch size may be 512 KB. For example, the storage controller SCON may determine that the address of the first file fragment is from 2048 to 3584 (i.e., 3072+ 512) based on the fragmentation information FRAG1_INFO1 and FRAG1_INFO2, and generate a prefetch stream to perform prefetching on data whose address is from 2048 to 3584 in the non-volatile memory. The storage controller SCON may perform prefetching based on the prefetch stream.

In some example embodiments, before transmitting the read command 1421 with respect to the second file fragment, the host HOST may generate the read command 1414 including the fragmentation information FRAG2_INFO1 and FRAG2_INFO2 with respect to the second file fragment. Although FIG. 14 illustrates that the read command 1414 includes the fragmentation information FRAG2_INFO1 and FRAG2_INFO2, example embodiments are not limited thereto, and the read command 1412 or 1413 may include the fragmentation information FRAG2_INFO1 and FRAG2_INFO2. The host HOST may transmit the read command 1414 to the storage controller SCON.

The storage controller SCON may generate prefetch stream based on the fragmentation information FRAG2_INFO1 and FRAG2_INFO2. For example, the storage controller SCON may determine that the address of the second file fragment starts from 8192 based on the fragmentation information FRAG2_INFO1 and FRAG2_INFO2, and generate a prefetch stream to perform prefetching from the address 8192 in the non-volatile memory after the prefetching on the first file fragment. The storage controller SCON may perform prefetching based on the prefetch stream.

For example, since the storage controller SCON performs prefetching on data whose address is 8192 at the time point of receiving the read command 1414 from the host HOST, by consecutively performing prefetching without interruption, a response time to the read commands 1411-1414 and 1421-1426 may be shortened and the sequential read performance may be enhanced.

Figure 15:
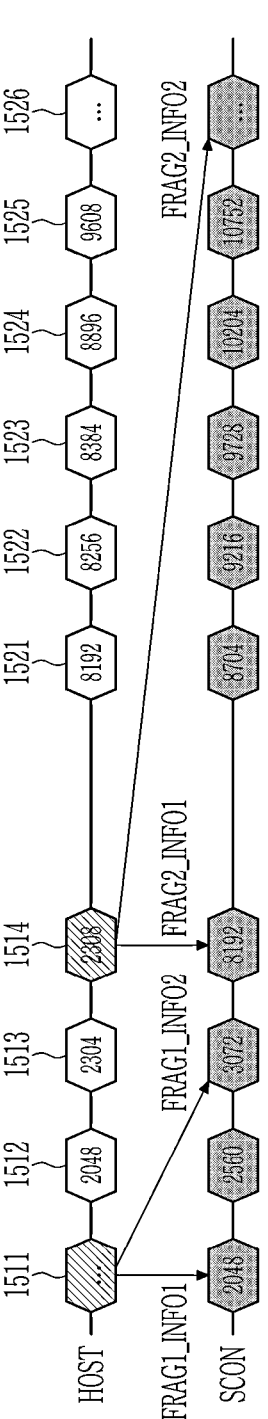
FIG. 15 is a timing diagram for showing an operation of a host and a storage controller according to some example embodiments.

FIG. 15 is a timing diagram for showing an operation of a host and a storage controller according to some example embodiments.

Referring to FIG. 15, the host HOST according to some example embodiments may transmit the read commands 1511 to 1514 and 1521 to 1526 to the storage controller SCON of the storage device. The storage device may include the non-volatile memory controlled by the storage controller SCON and the storage controller SCON. The non-volatile memory may fragment one file and store it as a plurality of file fragments. The host HOST may generate the read commands 1511 to 1514 and 1521 to 1526 based on the address information with respect to the plurality of file fragments. For example, the read commands 1511 to 1514 may correspond to the first file fragment among the plurality of file fragments, and the read commands 1521 to 1526 may correspond to the second file fragment among the plurality of file fragments. The host HOST may generate the read commands 1511 to 1514 including consecutive addresses in order to read the first file fragment, and generate the read commands 1521 to 1526 including consecutive addresses in order to read the second file fragment. In some example embodiments, since the first file fragment and the second file fragment are discontinuous, a discontinuity may occur between the read command 1514 and the read command 1521.

The host HOST may designate different chunk sizes when generating each of the read commands 1511 to 1514 and 1521 to 1526. The chunk size may be a size of data to be read from the non-volatile memory for one read command. For example, the host HOST may designate a chunk size of 256 KB to the read command 1512, designate a chunk size of 4 KB to the read command 1513, designate a chunk size of 1024 KB to the read command 1514, designate a chunk size of 64 KB to the read command 1521, designate a chunk size of 128 KB to the read command 1522, designate a chunk size of 512 KB to the read command 1523, designate a chunk size of 712 KB to the read command 1524, and designate a chunk size of 512 KB to the read command 1525.

The host HOST may generate the read command 1511 including the fragmentation information FRAG1_INFO1 and FRAG1_INFO2 with respect to the first file fragment. In some example embodiments, the fragmentation information FRAG1_INFO1 may indicate the start address of the first file fragment, and the fragmentation information FRAG1_INFO2 may indicate the end address of the first file fragment. In some example embodiments, the fragmentation information FRAG1_INFO1 may indicate the start address of the first file fragment, and the fragmentation information FRAG1_INFO2 may indicate the fragment size of the first file fragment.

The host HOST may transmit the read command 1511 to the storage controller SCON. The storage controller SCON may generate prefetch stream based on the fragmentation information FRAG1_INFO1 and FRAG1_INFO2. In some example embodiments, the host HOST may generate the prefetch stream by using a predetermined prefetch size. For example, the prefetch size may be 512 KB. For example, the storage controller SCON may determine that the address of the first file fragment is from 2048 to 3332 (i.e., 2308+1024) based on the fragmentation information FRAG1_INFO1 and FRAG1_INFO2, and generate a prefetch stream to perform prefetching on data whose address is from 2048 to 3584 (i.e., 3072+512) in the non-volatile memory. The storage controller SCON may perform prefetching based on the prefetch stream.

In some example embodiments, before transmitting the read command 1521 with respect to the second file fragment, the host HOST may generate the read command 1514 including the fragmentation information with respect to the second file fragment FRAG2_INFO1 and FRAG2_INFO2. Although FIG. 15 illustrates that the read command 1514 includes the fragmentation information FRAG2_INFO1 and FRAG2_INFO2, example embodiments are limited thereto, and the read command 1512 or 1513 may include the fragmentation information FRAG2_INFO1 and FRAG2_INFO2. The host HOST may transmit the read command 1514 to the storage controller SCON.

The storage controller SCON may generate prefetch stream based on the fragmentation information FRAG2_INFO1 and FRAG2_INFO2. For example, the storage controller SCON may determine that the address of the second file fragment starts from 8192 based on the fragmentation information FRAG2_INFO1 and FRAG2_INFO2, and generate a prefetch stream to perform prefetching from the address 8192 in the non-volatile memory after the prefetching on the first file fragment. The storage controller SCON may perform prefetching based on the prefetch stream.

For example, since the storage controller SCON performs prefetching on data whose address is 8192 at the time point of receiving the read command 1514 from the host HOST, by consecutively performing prefetching without interruption, a response time to the read commands 1511 to 1514 and 1521 to 1526 may be shortened and the sequential read performance may be enhanced.

Figure 16:
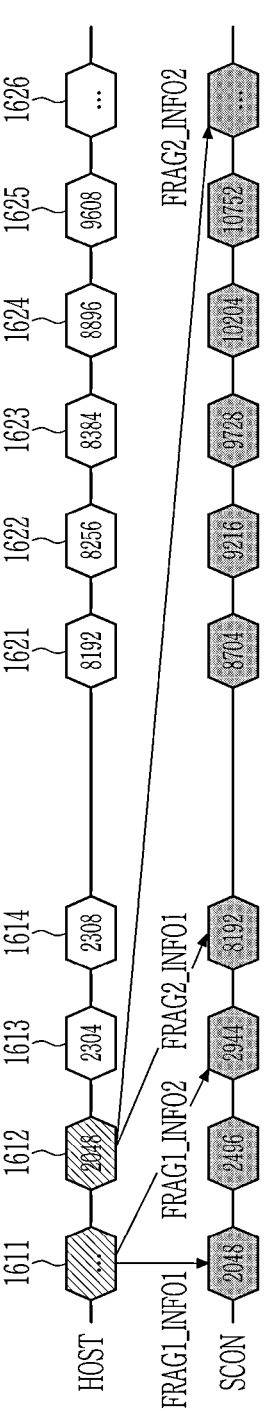
FIG. 16 is a timing diagram for showing an operation of a host and a storage controller according to some example embodiments.

FIG. 16 is a timing diagram for showing an operation of a host and a storage controller according to some example embodiments.

Referring to FIG. 16, the host HOST according to some example embodiments may transmit the read commands 1611 to 1614 and 1621 to 1626 to the storage controller SCON of the storage device. The storage device may include the non-volatile memory controlled by the storage controller SCON and the storage controller SCON. The non-volatile memory may fragment one file and store it as a plurality of file fragments. The host HOST may generate the read commands 1611 to 1614 and 1621 to 1626 based on the address information with respect to the plurality of file fragments. For example, the read commands 1611 to 1614 may correspond to the first file fragment among the plurality of file fragments, and the read commands 1621 to 1626 may correspond to the second file fragment among the plurality of file fragments. The host HOST may generate the read commands 1611 to 1614 including consecutive addresses in order to read the first file fragment, and generate the read commands 1621 to 1626 including consecutive addresses in order to read the second file fragment. In some example embodiments, since the first file fragment and the second file fragment are discontinuous, a discontinuity may occur between the read command 1614 and the read command 1621.

The host HOST may designate different chunk sizes when generating each of the read commands 1611 to 1614 and 1621 to 1626. The chunk size may be a size of data to be read from the non-volatile memory for one read command. For example, the host HOST may designate a chunk size of 256 KB to the read command 1612, designate a chunk size of 4 KB to the read command 1613, designate a chunk size of 1024 KB to the read command 1614, designate a chunk size of 64 KB to the read command 1621, designate a chunk size of 128 KB to the read command 1622, designate a chunk size of 512 KB to the read command 1623, designate a chunk size of 712 KB to the read command 1624, and designate a chunk size of 512 KB to the read command 1625.

The host HOST may generate the read command 1611 including the fragmentation information FRAG1_INFO1 and FRAG1_INFO2 with respect to the first file fragment. In some example embodiments, the fragmentation information FRAG1_INFO1 may indicate the start address of the first file fragment, and the fragmentation information FRAG1_INFO2 may indicate the end address of the first file fragment. In some example embodiments, the fragmentation information FRAG1_INFO1 may indicate the start address of the first file fragment, and the fragmentation information FRAG1_INFO2 may indicate the fragment size of the first file fragment.

The host HOST may transmit the read command 1611 to the storage controller SCON. The storage controller SCON may generate prefetch stream based on the fragmentation information FRAG1_INFO1 and FRAG1_INFO2. In some example embodiments, the host HOST may determine size of the first file fragment based on the fragmentation information FRAG1_INFO1 and FRAG1_INFO2, and determine a prefetch size based on size of the first file fragment. The host HOST may generate a prefetch stream using a determined prefetch size. That is, the storage controller SCON may determine that the address of the first file fragment is from 2048 to 3332 (i.e., 2308+1024) based on the fragmentation information FRAG1_INFO1 and FRAG1_INFO2, and generate a prefetch stream to perform prefetching on data whose address is from 2048 to 3584 (i.e., 3072+512) in the non-volatile memory. For example, the host HOST may determine that the size of the first file fragment is 1284 (i.e., 3332-2048), determine a first prefetch size based on size of the first file fragment, and generate a prefetch stream with respect to the first file fragment based on the first prefetch size. The storage controller SCON may perform prefetching based on the prefetch stream.

In some example embodiments, before transmitting the read command 1621 with respect to the second file fragment, the host HOST may generate the read command 1612 including the fragmentation information with respect to the second file fragment FRAG2_INFO1 and FRAG2_INFO2. Although FIG. 16 illustrates that the read command 1612 includes the fragmentation information FRAG2_INFO1 and FRAG2_INFO2, example embodiments are not limited thereto, and the read command 1613 or 1614 may include the fragmentation information FRAG2_INFO1 and FRAG2_INFO2. The host HOST may transmit the read command 1612 to the storage controller SCON.

The storage controller SCON may generate prefetch stream based on the fragmentation information FRAG2_INFO1 and FRAG2_INFO2. For example, the storage controller SCON may determine that the address of the second file fragment starts from 8192 based on the fragmentation information FRAG2_INFO1 and FRAG2_INFO2, and generate a prefetch stream to perform prefetching from the address 8192 in the non-volatile memory after the prefetching on the first file fragment. In some example embodiments, the host HOST may determine size of the second file fragment based on the fragmentation information FRAG2_INFO1 and FRAG2_INFO2, and determine a prefetch size based on size of the second file fragment. For example, the host HOST may determine that the size of the second file fragment is 4608 (i.e., 12800-8192), determine a second prefetch size based on size of the second file fragment, and generate a prefetch stream with respect to the second file fragment based on the second prefetch size. Here, the second prefetch size may be larger than the first prefetch size. The storage controller SCON may perform prefetching based on the prefetch stream.

For example, since the storage controller SCON receives the read command 1612 from the host HOST, performs prefetching on the first file fragment, and then performs prefetching on data whose address is 8192, by consecutively performing prefetching without interruption, a response time to the read commands 1611 to 1612 and 1621 to 1626 may be shortened and the sequential read performance may be enhanced.

Figure 17:
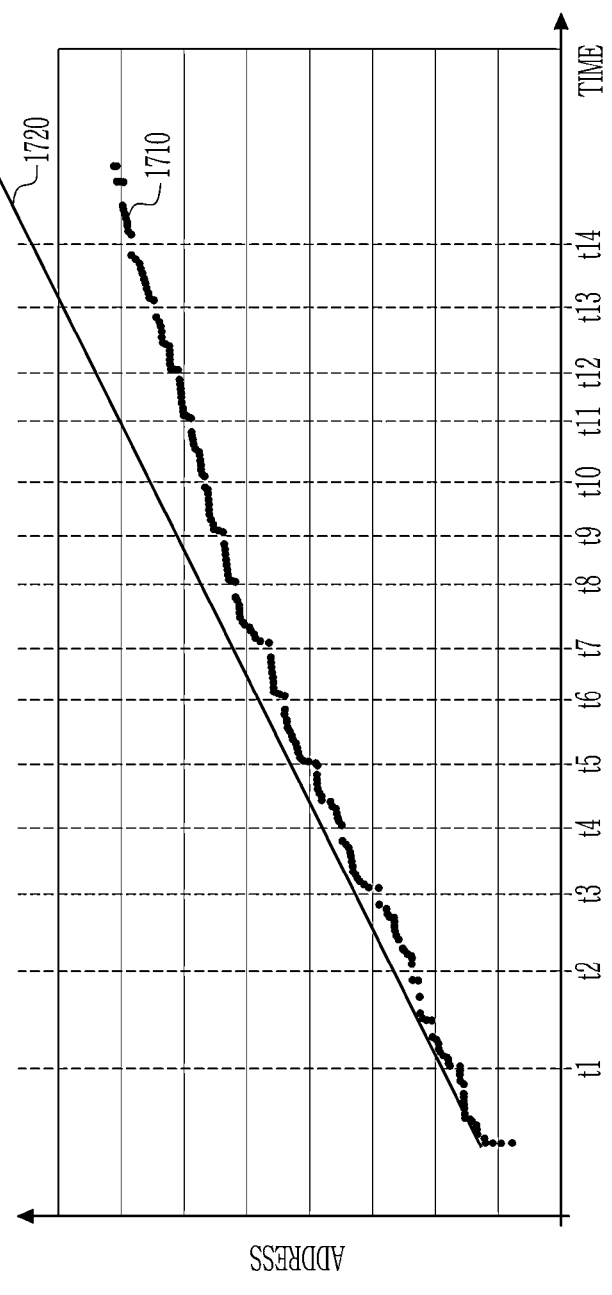
FIG. 17 is a graph for showing a sequential read performance of an electronic device according to some example embodiments.

FIG. 17 is a graph for showing a sequential read performance of an electronic device according to some example embodiments.

Referring to FIG. 17, an electronic device according to some example embodiments may fragment one file and store the plurality of file fragments in the storage device. The host of the electronic device may transmit the read command together with addresses of a plurality of file fragments to the storage device. The storage device may perform prefetching in response to the read command and transmit a response to the read command to the host according to the prefetch result.

A graph 1710 is a graph when a conventional electronic device performs sequential reading. Referring to graph 1710, in a conventional electronic device, when a host transmits the read command with respect to the plurality of file fragments to the storage device, the storage device performs prefetching based on the address of the read command. The storage device may sequentially perform prefetching, but may perform unnecessary prefetching at a time point when address discontinuity occurs (e.g., t1 to t14). That is, conventional electronic devices may have relatively low sequential read performance due to unnecessary prefetching.

A graph 1720 is a graph when an electronic device according to some example embodiments performs sequential reading. Referring to graph 1720, in an electronic device according to some example embodiments, a host may transmit the fragmentation information of a file fragment to a storage device together with the read command with respect to a plurality of file fragments. Storage device may perform prefetching based on the fragmentation information. Since the storage device performs prefetching based on the fragmentation information, it may continuously perform prefetching even at a time point when addresses are discontinuous (e.g., t1 to t14). For example, an electronic device according to some example embodiments may perform sequential prefetching and thus improve sequential read performance.

Figure 18:
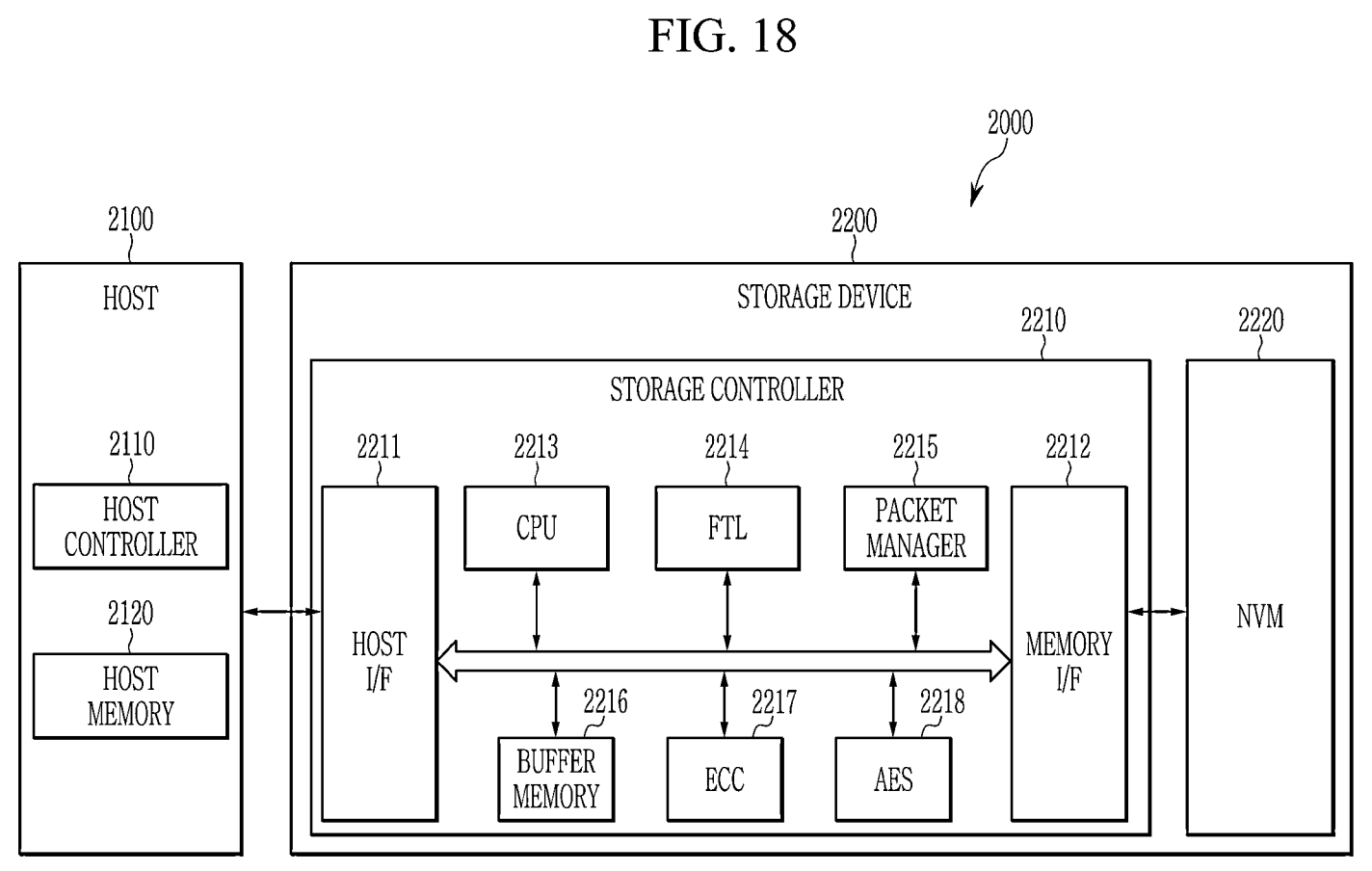

FIG. 18 is a schematic block diagram of a computing system according to some example embodiments.

Referring to FIG. 18, a computing system 2000 may be implemented as a PC, a data server, a laptop computer, vehicle electrical components, or a portable device. Portable device may be implemented as a mobile phone, a smart phone, a tablet PC, a wearable device, a PDA, an EDA, a digital still camera, a digital video camera, a PMP, a PND, a handheld game console, or an e-book, but example embodiments are not limited thereto. In some example embodiments, the computing system 2000 may be implemented as a system on a chip (SoC).

The computing system 2000 may include a host 2100 and a storage device 2200. The host 2100 may communicate with the storage device 2200 through various interfaces. The host 2100 may request a data processing operation, e.g., a data read operation, a data write (program) operation, and a data erase operation, from the storage device 2200. For example, the host 2100 may be a CPU, GPU, microprocessor, or AP, or the like, but example embodiments are not limited thereto.

The host 2100 may include a host controller 2110 and a host memory 2120. The host memory 2120 may function as a buffer memory for temporarily storing data to be transmitted to the storage device 2200 or data transmitted from the storage device 2200.

The storage device 2200 may include a storage controller 2210 and non-volatile memory (NVM) 2220. The storage device 2200 may include storage media for storing data according to a request from the host 2100. For example, the storage device 2200 may be implemented in various types such as an SSD, an eMMC, a UFS, a CF, an SD, a micro-SD, a mini-SD, an xD, or a memory stick.

In some example embodiments, when the storage device 2200 is an SSD, the storage device 2200 may be a device conforming to the non-volatile memory express (NVMe) standard. In some example embodiments, when the storage device 2200 is an embedded memory or an external memory, the storage device 2200 may be a device conforming to the UFS standard or the eMMC standard. The host 2100 and the storage device 2200 may each generate, and may transmit a packet according to an adopted standard protocol.

In some example embodiments, when the non-volatile memory 2220 of the storage device 2200 includes a flash memory, the flash memory may include a 2D NAND memory array or a 3D NAND memory array. In some example embodiments, the storage device 2200 may include other various types of non-volatile memories. For example, other various types of memory such as MRAM, STT-RAM, CBRAM, FRAM, PRAM, and RRAM may be applied to the storage device 2200, but example embodiments are not limited thereto.

In some example embodiments, the host controller 2110 and the host memory 2120 may be implemented as separate semiconductor chips. Alternatively, in some example embodiments, the host controller 2110 and the host memory 2120 may be integrated on a same semiconductor chip. For example, the host controller 2110 may be any one of a plurality of modules included in an application processor (AP), and such an AP may be implemented as an system on chip (SoC). In some example embodiments, the host memory 2120 may be an embedded memory included in the AP, or may be a non-volatile memory or a memory module positioned outside the AP, but example embodiments are not limited thereto.

The host controller 2110 may manage an operation for storing data (e.g., program data) of the buffer area in the non-volatile memory 2220 or storing data (e.g., read data) of the non-volatile memory 2220 in the buffer area. Example embodiments described with reference to FIG. 1 to FIG. 17 may be equally applied to the host 2100, the storage controller 2210, and the non-volatile memory 2220. For example, the host 2100 may transmit the fragmentation information together with the read command to the storage controller 2210. Fragmentation information may be information about the plurality of file fragments that the non-volatile memory 2220 stores for one file. The storage controller 2210 may schedule prefetching based on the fragmentation information and perform prefetching on data in the non-volatile memory 2220.

The storage controller 2210 may include a host interface 2211, a memory interface 2212 and a CPU 2213. In some example embodiments, the storage controller 2210 may further include a flash translation layer (FTL) 2214, packet manager (2215), buffer memory (2216), ECC (Error Correction Code) 2217 engine, and AES (Advanced Encryption Standard) 2218 engine.

In some example embodiments, the storage controller 2210 may further include a working memory into which the FTL 2214 is loaded, and, in some example embodiments, when the CPU 2213 executes the flash conversion layer (FTL) 2214, a data program operation and a read operation to the non-volatile memory may be controlled.

The host interface 2211 may transmit and receive packets to and from the host 2100. A packet transmitted from the host 2100 to the host interface 2211 may include a command or data to be programmed in the non-volatile memory 2220, and a packet transmitted from the host interface 2211 to the host 2100 may include a response to a command or data read from the non-volatile memory 2220.

The memory interface 2212 may transmit data to be programmed into the non-volatile memory 2220 to the non-volatile memory 2220 or may receive data read from the non-volatile memory 2220. In some example embodiments, the memory interface 2212 may be implemented to comply with a standard protocol such as Toggle or ONFI.

The flash conversion layer (FTL) 2214 may perform various functions such as address mapping, wear-leveling, and garbage collection. The address mapping operation is an operation of changing a logical address received from the host into a physical address used to actually store data in the non-volatile memory 2220. Wear-leveling, which is a technique for preventing excessive deterioration of a specific block by uniformly using blocks in the non-volatile memory 2220, may illustratively be implemented through a firmware technique that balances erase counts of physical blocks. Garbage collection is a technique for securing usable capacity in the non-volatile memory 2220 by copying valid data of a block to a new block and then erasing the old block.

The packet manager 2215 may generate a packet according to an interface protocol negotiated with the host 2100 or may parse various types of information from a packet received from the host 2100. In some example embodiments, the buffer memory 2216 may temporarily store data to be programmed into the non-volatile memory 2220 or data to be read from the non-volatile memory 2220. The buffer memory 2216 may be included in the storage controller 2210, but may alternatively be positioned outside the storage controller 2210.

The ECC engine 2217 may perform error detection and correction functions for read data read from the non-volatile memory 2220. More specifically, the ECC engine 2217 may generate parity bits for write data to be written in the non-volatile memory 2220, and the parity bits generated in this way may be stored in the non-volatile memory 2220 together with the program data. When reading data from the non-volatile memory 2220, the ECC engine 2217 may correct errors in the read data using parity bits read from the non-volatile memory 2220 together with the read data, and may output error-corrected read data.

The AES engine 2218 may perform at least one of an encryption operation or a decryption operation on data input to the storage controller 2210 using a symmetric-key algorithm.

Figure 19:
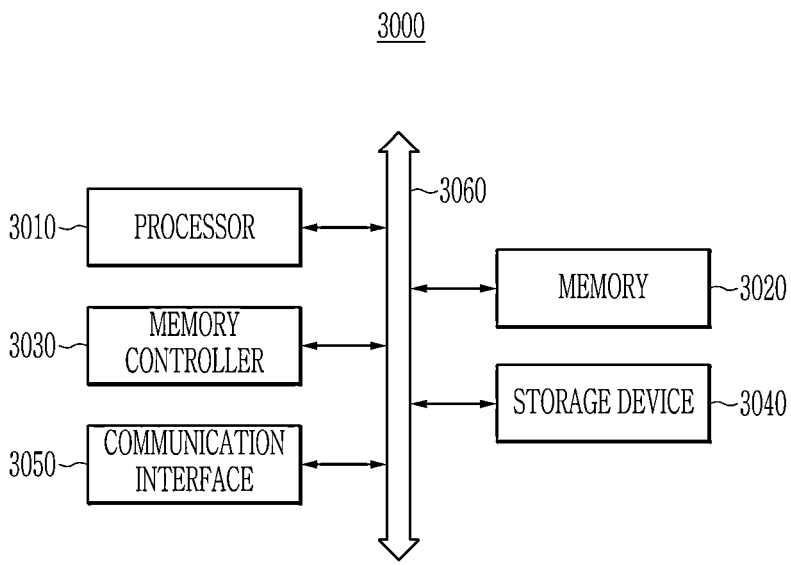
FIG. 19 is a schematic block diagram of a computing device according to some example embodiments.

FIG. 19 is a schematic block diagram of a computing system according to some example embodiments.

Referring to FIG. 19, the computing system 3000 includes a processor 3010, a memory 3020, a memory controller 3030, a storage device 3040, a communication interface 3050, and a bus 3060. The computing system 3000 may further include other general-purpose components.

The processor 3010 controls the overall operation of each component of the computing system 3000. The processor 3010 may be implemented as at least one of various processing units such as a central processing unit (CPU), an application processor (AP), a graphic processing unit (GPU), and the like.

The memory 3020 stores various data and commands. The memory controller 3030 controls the transfer of data or commands to and from memory 3020. In some example embodiments, the memory controller 3030 may be provided as a separate chip from the processor 3010. In some example embodiments, the memory controller 3030 may be provided as an internal component of the processor 3010.

The storage device 3040 non-temporarily stores programs and data. Example embodiments described about the storage device with reference to FIG. 1 to FIG. 18 may be equally applied to the storage device 3040. In some example embodiments, the storage device 3040 may include a non-volatile memory. The communication interface 3050 supports wired and wireless Internet communication of the computing system 3000. In some example embodiments, the communication interface 3050 may support various communication methods other than Internet communication. The bus 3060 provides a communication function between components of the computing system 3000. The bus 3060 may include at least one type of bus according to a communication protocol between components.

In some example embodiments, each component or combinations of two or more components described with reference to FIG. 1 to FIG. 19 may be implemented as a digital circuit, a programmable or non-programmable logic device or array, an application specific integrated circuit (ASIC), or the like. For example, each component or combination of two or more components described with reference to FIG. 1 to FIG. 19 may include or be implemented as respective processing circuitry such as hardware (e.g., logic circuits) or a combination of hardware and software (e.g., a computer-based electronic system) like a processor executing instruction codes or program routines (e.g., a software program). The instruction codes or the program routines may be stored in any storage device located inside or outside the computer based electronic system.

While the inventive concepts have been shown and described with reference to some example embodiments thereof, it will be understood that the inventive concepts are not limited to the example embodiments described, but, on the contrary, various changes in form and detail may be made therein without departing from the spirit and scope of the following claims.

What is claimed is:

1. A storage device, comprising:
   a non-volatile memory configured to store one file as a plurality of file fragments having non-consecutive addresses different from each other, each file fragment of the plurality of file fragments including a plurality of data chunks having consecutive addresses; and
   a storage controller configured to receive a read command with respect to the plurality of file fragments from a host through a UFS protocol information unit (UPIU), and perform prefetching on the plurality of file fragments based on file fragmentation information included in a field of the UPIU allocated as an extra header segment (EHS) field of the UPIU, the prefetching being performed consecutively on the plurality of file fragments having the non-consecutive addresses different from each other.

2. The storage device of claim 1, wherein the storage controller is configured to receive a plurality of read commands, determine whether the plurality of read commands are consecutive, and perform the prefetching on the plurality of file fragments in response to the plurality of read commands being consecutive.

3. The storage device of claim 1, wherein the EHS field includes a number of the plurality of file fragments in a first field region, includes a field size allocated to a file fragment range in a second field region, and includes the file fragment range in a third field region.

4. The storage device of claim 3, wherein:
the first field region is before the second field region; and
the second field region is after the third field region.

5. The storage device of claim 3, wherein:
a first field region size of the first field region is greater than a second field region size of the second field region; and
a third field region size of the third field region is equal to or greater than the first field region size of the first field region.

6. The storage device of claim 1, wherein the file fragmentation information comprises at least one of a number of the plurality of file fragments, a file fragment range, or a field size allocated to the file fragment range.

7. The storage device of claim 6, wherein the file fragment range comprises a start address and an end address of at least one file fragment among the plurality of file fragments.

8. The storage device of claim 6, wherein the file fragment range comprises a start address and a fragment size of at least one file fragment among the plurality of file fragments.

9. The storage device of claim 6, wherein the storage controller is configured to determine a prefetch start address and a prefetch end address based on the file fragment range and perform the prefetching based on the prefetch start address and the prefetch end address.

10. The storage device of claim 1, wherein:
the non-volatile memory is configured to store, from among the plurality of file fragments, a first file fragment and a second file fragment that is discontinuous with the first file fragment; and
the storage controller is configured to receive a first read command with respect to the first file fragment from the host, and perform prefetching on the second file fragment based on the file fragmentation information included in the first read command.

11. The storage device of claim 10, wherein the storage controller is configured to receive a second read command with respect to the first file fragment from the host, the second read command preceding the first read command, and perform prefetching on the first file fragment based on the file fragmentation information included in the second read command.

12. The storage device of claim 1, wherein the storage controller is configured to determine a size of a file fragment based on the file fragmentation information, determine a prefetch size based on the size of the file fragment, and perform the prefetching based on the prefetch size.

13. The storage device of claim 1, wherein the storage controller is configured to determine a prefetch size based on a chunk size of the read command, and perform the prefetching based on the prefetch size.

14. A prefetch method, comprising:
receiving a first read command and a second read command from a host through a UFS protocol information unit (UPIU);
determining whether file fragmentation information included in a field of the UPIU allocated as an extra header segment (EHS) field of the UPIU of the first read command is valid in response to a first address of the first read command and a second address of the second read command being consecutive;

performing a prefetch from a non-volatile memory configured to store one file as a plurality of file fragments having non-consecutive addresses different from each other, based on the file fragmentation information in response to the file fragmentation information being valid, the prefetch being performed consecutively on the plurality of file fragments having the non-consecutive addresses different from each other; and
sending first data corresponding to the first read command and second data corresponding to the second read command to the host based on a prefetch result,
each file fragment of the plurality of file fragments including a plurality of data chunks having consecutive addresses.

15. The prefetch method of claim 14, wherein the determining comprises determining that the file fragmentation information is invalid in response to the file fragmentation information including information of another prefetch that has been performed.

16. The prefetch method of claim 15, further comprising:
determining a prefetch start address based on the file fragmentation information in response to the file fragmentation information being invalid;
generating a prefetch stream based on the prefetch start address; and
performing the prefetch based on the prefetch stream.

17. The prefetch method of claim 14, further comprising:
reading the first data corresponding to the first read command and the second data corresponding to the second read command to send to the host without performing the prefetch in response to the first address of the first read command and the second address of the second read command being discontinuous.

18. The prefetch method of claim 14, wherein the performing the prefetch comprises:
determining a prefetch start address and a prefetch end address based on the file fragmentation information;
generating a prefetch stream based on the prefetch start address and the prefetch end address; and
performing the prefetch based on the prefetch stream.

19. An electronic device, comprising:
a host configured to manage a plurality of fragmentation information with respect to a plurality of file fragments having consecutive addresses for one file, and generate at least one read command including the plurality of fragmentation information in an extra header segment (EHS) field; and
a storage device configured to store the one file as the plurality of file fragments, perform prefetching based on the plurality of fragmentation information through a UFS protocol information unit (UPIU), and process the at least one read command according to a prefetch result, the prefetching being performed consecutively on the plurality of file fragments stored in the storage device, the plurality of file fragments having non-consecutive addresses different from each other,
each file fragment of the plurality of file fragments including a plurality of data chunks having consecutive addresses.

20. The electronic device of claim 19, wherein:
the plurality of file fragments comprises a first file fragment and a second file fragment subsequent to the first file fragment; and
the host is configured to send a read command with respect to the first file fragment and send fragmentation information with respect to the second file fragment to the storage device.

\* \* \* \* \*